United States Patent [19]

De Vincentiis et al.

[11] 3,913,093

[45] Oct. 14, 1975

[54] METHOD OF AND MEANS FOR TRANSCODING BINARY PULSES

[75] Inventors: Girolamo De Vincentiis; Renato Dogliotti; Angelo Luvison, all of Turin, Italy

[73] Assignee: SCELT Centro Studi e Laboratori Telecomunicazioni, Turin, Italy

[22] Filed: Mar. 4, 1974

[21] Appl. No.: 447,783

[52] U.S. Cl........... 340/347 DD; 325/38 A; 235/154

[51] Int. Cl.[2]........................................ H03K 13/24

[58] Field of Search............ 325/38 A; 340/347 DD; 235/154

[56] References Cited

UNITED STATES PATENTS

| | | | |
|---|---|---|---|
| 3,369,229 | 2/1968 | Dorros | 340/347 |
| 3,414,677 | 12/1968 | Quinlan | 179/15.55 |
| 3,587,088 | 6/1971 | Franszek | 340/347 |

*Primary Examiner*—Malcolm A. Morrison
*Assistant Examiner*—Vincent J. Sunderdick
*Attorney, Agent, or Firm*—Karl F. Ross; Herbert Dubno

[57] ABSTRACT

A binary pulse train is converted into a generally balanced seven-level output signal, ranging from −3 to +3, by translating each four-bit group into a pair of voltage levels representing a character in one of three alphabets, the choice of alphabet being determined by the mean voltage of the previously generated output signal. With a mean voltage of magnitude 0 or +1, a first alphabet is chosen with character unbalances ranging between 0 and +3. When the mean voltage reaches +2 or +3, a second alphabet is used whose character unbalances range between +2 and −2. If the mean voltage attains a value of +4 or +5, a third alphabet is utilized in which the character unbalance varies between 0 and −4. Half the characters of the second alphabet are identical with corresponding characters of the first alphabet; the other half are identical with corresponding characters of the third alphabet.

10 Claims, 9 Drawing Figures

| BINARY WORD | CODE ALPHABETS $A_1$ | CODE ALPHABETS $A_2$ | CODE ALPHABETS $A_3$ |
|---|---|---|---|
| 0 0 0 0 | +3/−3 | 0/−2 | 0/−2 |
| 0 0 0 1 | +3/−2 | −1/−1 | −1/−1 |
| 0 0 1 0 | +2/+1 | 0/−1 | 0/−1 |
| 0 1 0 0 | +1/+2 | −2/0 | −2/0 |
| 1 0 0 0 | 0/+3 | −1/0 | −1/0 |
| 0 0 1 1 | +3/−1 | −2/+1 | −2/+1 |
| 0 1 0 1 | +3/0 | −1/+1 | −1/+1 |
| 1 0 0 1 | +2/+2 | −2/+2 | −2/+2 |
| 1 0 1 0 | +2/−2 | +2/−2 | −3/+3 |
| 1 1 0 0 | +1/−1 | +1/−1 | −3/+2 |
| 0 1 1 0 | +2/−1 | +2/−1 | −3/+1 |
| 1 1 1 0 | +1/0 | +1/0 | −3/0 |
| 1 1 0 1 | +2/0 | +2/0 | −2/−1 |
| 1 0 1 1 | 0/+1 | 0/+1 | −1/−2 |
| 0 1 1 1 | +1/+1 | +1/+1 | 0/−3 |
| 1 1 1 1 | 0/+2 | 0/+2 | −2/−2 |

| BINARY WORD | CODE ALPHABETS | | | | | | | | | | | | | | | | | |
|---|---|---|---|---|---|---|---|---|---|---|---|---|---|---|---|---|---|---|
| | $A_1$ | | | | | | $A_2$ | | | | | | $A_3$ | | | | | |
| 0000 | 0 | 1 | 1 | 1 | 0 | 1 | 0 | 0 | 0 | 1 | 1 | 0 | 0 | 0 | 0 | 1 | 1 | 0 |
| 0001 | 0 | 1 | 1 | 1 | 1 | 0 | 1 | 1 | 1 | 1 | 1 | 1 | 1 | 1 | 1 | 1 | 1 | 1 |
| 0010 | 0 | 1 | 0 | 0 | 0 | 1 | 0 | 0 | 0 | 1 | 1 | 1 | 0 | 0 | 0 | 0 | 0 | 0 |
| 0100 | 0 | 0 | 1 | 0 | 1 | 0 | 1 | 1 | 0 | 0 | 0 | 0 | 1 | 1 | 0 | 0 | 0 | 0 |
| 1000 | 0 | 0 | 0 | 0 | 1 | 1 | 1 | 1 | 1 | 0 | 0 | 0 | 1 | 1 | 1 | 0 | 0 | 0 |
| 0011 | 0 | 1 | 1 | 1 | 1 | 1 | 1 | 1 | 0 | 0 | 0 | 1 | 1 | 1 | 0 | 0 | 0 | 1 |
| 0101 | 0 | 1 | 1 | 0 | 0 | 0 | 1 | 1 | 1 | 0 | 0 | 1 | 1 | 1 | 1 | 0 | 0 | 1 |
| 1001 | 0 | 1 | 0 | 0 | 1 | 0 | 1 | 1 | 0 | 0 | 1 | 0 | 1 | 1 | 0 | 0 | 1 | 0 |
| 1010 | 0 | 1 | 0 | 1 | 1 | 0 | 0 | 1 | 0 | 1 | 1 | 0 | 1 | 0 | 1 | 0 | 1 | 1 |
| 1100 | 0 | 0 | 1 | 1 | 1 | 1 | 0 | 0 | 1 | 1 | 1 | 1 | 1 | 0 | 1 | 0 | 1 | 0 |
| 0110 | 0 | 1 | 0 | 1 | 1 | 1 | 0 | 1 | 0 | 1 | 1 | 1 | 1 | 0 | 1 | 0 | 0 | 1 |
| 1110 | 0 | 0 | 1 | 0 | 0 | 0 | 0 | 0 | 1 | 0 | 0 | 0 | 1 | 0 | 1 | 0 | 0 | 0 |
| 1101 | 0 | 1 | 0 | 0 | 0 | 0 | 0 | 1 | 0 | 0 | 0 | 0 | 1 | 1 | 0 | 1 | 1 | 1 |
| 1011 | 0 | 0 | 0 | 0 | 0 | 1 | 0 | 0 | 0 | 0 | 0 | 1 | 1 | 1 | 1 | 1 | 1 | 0 |
| 0111 | 0 | 0 | 1 | 0 | 0 | 1 | 0 | 0 | 1 | 0 | 0 | 1 | 0 | 0 | 0 | 1 | 0 | 1 |
| 1111 | 0 | 0 | 0 | 0 | 1 | 0 | 0 | 0 | 0 | 0 | 1 | 0 | 1 | 1 | 0 | 1 | 1 | 0 |
| $a_0 a_1 a_2 a_3$ | $b_1$ | $b_2$ | $b_3$ | $b_4$ | $b_5$ | $b_6$ | $b_7$ | $b_8$ | $b_9$ | $b_{10}$ | $b_{11}$ | $b_{12}$ | $b_{13}$ | $b_{14}$ | $b_{15}$ | $b_{16}$ | $b_{17}$ | $b_{18}$ |

METHOD OF AND MEANS FOR TRANSCODING BINARY PULSES

FIELD OF THE INVENTION

Our present invention relates to a system for the transcoding of digital information originally generated in the form of a binary pulse train, e.g. in the transmission of data or voice signals over a telephone line or other telecommunication channel.

BACKGROUND OF THE INVENTION

If binary pulses are transmitted directly over such a channel, the transmission rate is limited by considerations of bandwidth and resolution. Furthermore, the random nature of the pulses (whether of the on/off or the plus/minus type) gives rise to a voltage unbalance, i.e. introduces a substantial d-c component whose suppression in a low-pass filter, frequently included in this type of transmission path, leads to distortion. If the pulse voltage remains constant for a longer period, as in the case of consecutive transmission of numerous zeroes, the usual synchronization signal derived from the bit cadence at the receiver may be lost.

In commonly owned application Ser. No. 425,132 filed Dec. 17, 1973 by one of us, Girolamo De Vincentiis, et al., a system has been disclosed which remedies some of these inconveniences by expanding 4-bit groups of a binary pulse train into a so-called Walsh code. While this eliminates the problems of unbalance and synchronization, the redundancy inherent in the Walsh code reduces the transmission rate.

OBJECTS OF THE INVENTION

An important object of our present invention, therefore, is to provide a method of transcoding such binary pulse trains, i.e. of converting them into a different kind of coded signal, in a manner obviating the disadvantages referred to.

A related object is to provide an efficient transcoding system for this purpose.

SUMMARY OF THE INVENTION

In accordance with our present invention, an input signal in the form of a sequence of bits is converted into a generally balanced output signal by dividing that sequence into groups or words of $n$ bits each, with $n$ equal to 4, and assigning to each word a character in each of several alphabets, any character of each alphabet representing a pair of discrete voltage levels which range in integral steps from a positive limit $+m$ through zero to a negative limit $-m$, with $m$ equal to 3 so as to provide a total of seven discrete levels. In accordance with an important feature of our invention, the algebraic sum of the voltage levels of any character in one alphabet is either zero, as in the case of balanced characters with conjugate voltage levels such as +1 and −1, or (in the case of unbalanced characters) of a first polarity referred to hereinafter as positive; the algebraic sum of the voltage levels of any character in another alphabet is either zero or, in the case of an unbalanced character, is of a second polarity, referred to hereinafter as negative.

For each n-bit group or word of the sequence to be converted, a corresponding character is taken from a selected alphabet to synthesize a bipolar output signal whose voltage varies between the aforementioned discrete levels, starting with a character from the one alphabet whose algebraic sums are either zero or positive. The choice of alphabet is determined by the mean voltage of the previously generated portion of the output signal, the alphabet with zero and positive algebraic sums being selected in the case of mean voltages lying in a near-zero range with a relatively low maximum voltage (e.g. +1) whereas the alphabet with the zero and negative algebraic sums is selected in the case of mean voltages lying in an off-zero range with a relatively high maximum voltage of the same polarity (e.g. +5). The algebraic sums of the voltage levels of the code characters are so chosen as to tend to maintain the mean voltage of the past signal portion in the aforesaid near-zero range, more specifically at zero or positive values.

For this purpose, pursuant to a more specific feature of our invention, the highest absolute value of the algebraic sums of the voltage levels in the first-mentioned alphabet, i.e. the one without negative unbalances, should equal the absolute value (e.g. 4) of the difference between the maximum voltages of the two ranges referred to; conversely, the highest absolute value of the algebraic sums in the last-mentioned alphabet, i.e. the one without positive unbalances, should equal the absolute value (e.g. 4) of the minimum voltage level of the off-zero range.

According to an advantageous further development of our invention, a further alphabet is provided in which the algebraic sums of the characters can vary in both magnitude and polarity, e.g. from +2 through −2. This latter alphabet is selected whenever the mean voltage of the past signal portion lies in an intermediate range with a maximum voltage (e.g. +3) between the maximum voltages of the other two ranges. Thus, in such a system, the mean voltage may be shifted from the intermediate range (voltage levels +2, +3) to either the near-zero range (voltage levels 0, +1) or the off-zero range (voltage levels +4, +5) but never beyond the latter or below zero. When the highest levels are reached, the third alphabet with its negative unbalances is called into play but again cannot reduce the mean voltage to a value less than zero, The tendency of that mean voltage, therefore, is to remain close to zero on the side of the positive voltages.

In order to carry out this method, a system according to our invention comprises a register for the temporary storage of successive $n$-bit groups or words of the sequence to be converted, this register working into a logic circuit which responds to the stored bits in order to select the characters assigned thereto in the several alphabets. A preferably digital accumulator connected to the logic circuit determines the mean signal voltage and controls a set of switches for selecting a character from one of the several alphabets on the basis of that mean voltage according to the aforestated principles.

Advantageously, the logic circuit includes a set of gating networks connected to the input register, which is preferably a shift register whose stages are read out in parallel, and a digital/analog converter receiving the character in binary form for the gating networks and translating them into multilevel voltages. One of the output leads of the logic network indicates the polarity of the constituent voltage levels while other output leads, preferably a pair of them, determine their magnitudes.

With a choice of seven voltage levels, +3, +2, +1, 0, −1, −2, −3, 49 combinations are available as code characters. With exclusion of the combination 0/0, and of pairs whose algebraic sum exceeds the permissible limits of +4 in the specific example referred to, we still have 32 pairs which are sufficient for two full alphabets representing the 16 possible 4-bit words. However, we can provide three alphabets by borrowing half the characters of the first alphabet and half the characters of the third alphabet to construct the second alphabet.

BRIEF DESCRIPTION OF THE DRAWING

The above and other features of our invention will now be described in detail with reference to the accompanying drawing in which.

SPECIFIC DESCRIPTION

Figures 1, 2:
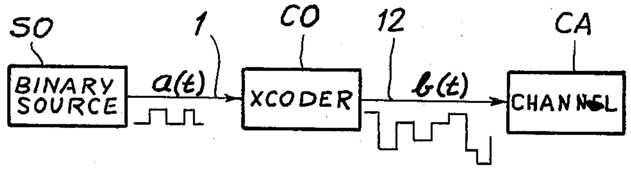
FIG. 1 is a block diagram of a signal-transmitting station embodying our invention.
FIG. 2 is a table showing the conversion of 4-bit words into characters of three code alphabets in the system of FIG. 1.

As shown in FIG. 1, a binary source SO generates an input signal $a(t)$ in the form of a sequence of bits delivered to an input 1 of a nonlinear transcoder CO which translates them into a multilevel signal $b(t)$ to be fed to a telecommunication channel CA.

The transcoder CO converts 4-bit groups or words of input signal $a(t)$ into a pair of discrete voltage levels of output signal $b(t)$, these voltage levels being chosen from seven such levels having the integral values +3, +2, +1, 0, −1, −2, −3. The table of FIG. 2 shows the relationship between the 16 binary words 0000 through 1111 and corresponding pairs of voltage levels representing respective characters in three associated code alphabets $A_1$, $A_2$, $A_3$. In the first alphabet $A_1$, the top character corresponding to binary word 0000 consists of two voltage levels +3/−3 whose algebraic sum equals zero and which therefore may be described as balanced. Other balanced characters appearing in the three alphabets are −3/+3, +2/−2, −2/+2, +1/−1 and −1/+1. The pair 0/0 is not used.

The unbalanced characters of alphabet $A_1$ all have a positive algebraic sum. This algebraic sum does not exceed +4 in the upper eight characters of alphabet $A_1$; in its lower eight characters, in which the value +3 does not appear, this algebraic sum ranges from 0 through +2.

The lower eight characters of alphabet $A_2$ are identical with those of alphabet $A_1$ whereas its upper eight characters are the inversions of the lower ones. Thus, the algebraic sum of the upper half of alphabet $A_2$ ranges from 0 through −2, the overall range for the entire alphabet being from −2 through +2.

The upper eight characters of alphabet $A_3$ are identical with those of alphabet $A_2$ whereas the lower eight characters of alphabet $A_3$ correspond to the upper characters of alphabet $A_1$ (though not in quite the same order) with inverted sign. Thus, the algebraic sums of the upper half of alphabet $A_3$ range from 0 through −2 whereas those of its lower half range from 0 through −4.

Figures 3, 4:
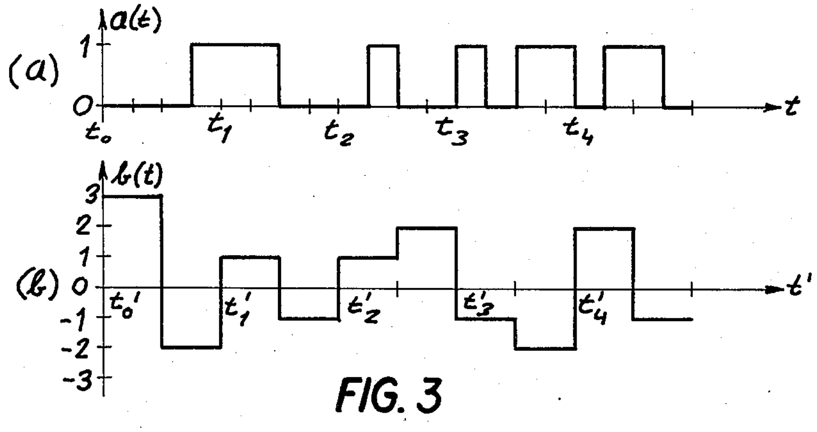
FIG. 3 is a pair of graphs illustrating a binary pulse sequence and a multilevel output signal corresponding thereto.
FIG. 4 is a table similar to that of FIG. 2, giving the binary equivalents of the characters represented in decimal notation in FIG. 2.

FIG. 3 more fully illustrates, in graph (*a*), a representative portion of input signal $a(t)$ and, in graph (*b*), a corresponding portion of output signal $b(t)$. Thus, the first four bits of signal $a(t)$ in FIG. 3 (*a*) correspond to the word 0001 which is equivalent of character +3/−2 in the first alphabet $A_1$; the initial part of signal $b(t)$, extending over a 4-bit period of input signal $a(t)$, is therefore a stepped voltage changing from the highest positive level +3 to the second-highest negative level −2.

In accordance with the teachings of our invention, as already outlined, the first alphabet $A_1$ is selected whenever the mean voltage of the preceding part of the output signal lies in a positive near-zero range, i.e. has the value 0 or +1 in the preferred embodiment here described. In the assumption that signal $a(t)$ starts at a time $t_0$ and that signal $b(t)$ starts at a time $t'_0$ (being delayed by four bits with reference to the former as more fully described below), the mean voltage at time $t'_0$ is zero so that the first alphabet is the one to use in transcoding the initial word 0001.

After that first word, the mean voltage is found to be +1 (corresponding to the unbalance of the character +3/−2) which is still in the near-zero range calling for the selection of characters from alphabet $A_1$. Since the second word starting at time $t_1$ has the configuration 1100, the equivalent character beginning at time $t'_1$ is the voltage pair +1/−1 which is balanced and therefore leaves unchanged the mean voltage of the preceding signal portion.

At time $t_2$ a new word 0100 is received, causing the generation at time $t'_2$ of the voltage pair +1/+2 corresponding to it in alphabet $A_1$. Since this latter voltage pair has an unbalance of +3, the mean voltage of the output signal is now changed to the value +4 which lies in the off-zero range calling for the selection of the next character from alphabet $A_3$. Since the word starting at time $t_3$ has the configuration 1011, this next character (beginning at time $t'_3$) is the voltage pair −1/−2 with an unbalance or algebraic sum of +3. This brings the mean voltage back to the lowest or near-zero range so that upon the occurrence of the next word 0110, starting at time $t_4$, the voltage pair +2/−1 is chosen from alphabet $A_1$ as a part of the output signal beginning at the time $t_4$. Since this part has an unbalance of +1, the total mean voltage of the past portion of signal $b(t)$ now lies in the intermediate voltage range, encompassing the levels +2 and +3; therefore the next-following character will be chosen from alphabet $A_2$.

FIG. 4 is a table similar to that of FIG. 2, except that the voltage levels of alphabets $A_1$–$A_3$ have been translated into binary form. The several bits of each word of input signal $a(t)$ have been designated $a_0$, $a_1$, $a_2$ and $a_3$ in FIG. 4 in which the 18 digital columns of the three alphabets $A_1$, $A_2$ and $A_3$ have been labeled $b_1$–$b_{18}$.

The negative values of the voltage levels in the table of FIG. 2 have been represented in FIG. 4 by the complements of the corresponding positive values with reference to binary 1000; thus, for example, voltage level −3 is translated into binary 101. Hence, as will be more fully described hereinafter with reference to FIG. 9, any 3-bit combination starting with a "0" increases the voltage level and any such combination starting with a "1" reduces the voltage level in an accumulator ACC by a number of steps as determined by the two following bits, this number ranging from 0 through 3. The use of the binary complement, however, is not essential as long as the first bit of any 3-bit grouping shown in FIG. 4 indicates the polarity of the voltage level whose magnitude is determined by the other two bits; the voltage level −3, for example, could be represented by the bits 111 rather than 101 as shown.

Figure 5:
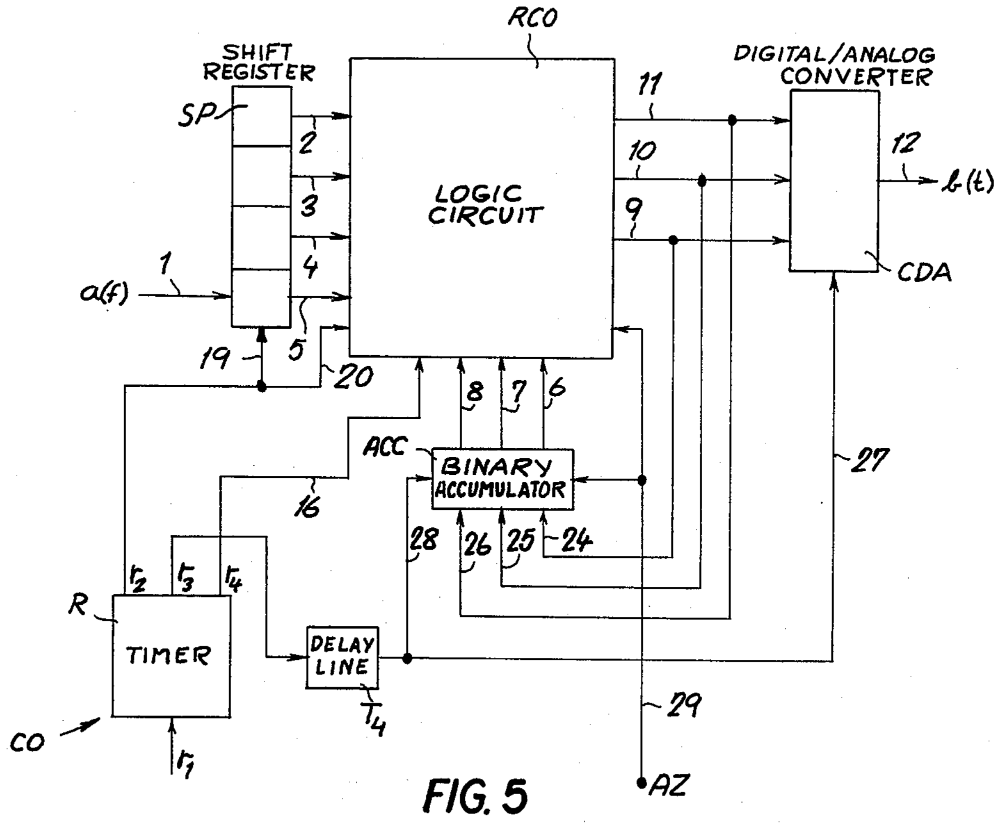
FIG. 5 is a block diagram of a transcoder according to our invention, forming part of the system of FIG. 1.
Figure 7:
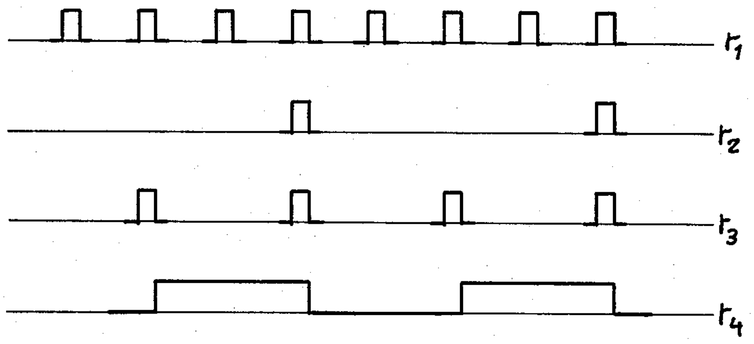
FIG. 7 is a set of graphs showing several trains of timing pulses used in the transcoder of FIG. 5.

In FIG. 5 we have shown details of the nonlinear transcoder CO of FIG. 1. Input 1, carrying the binary signal $a(t)$, terminates at a series-parallel converter in the form of a 4-stage shift register SP with stage outputs 2, 3, 4 and 5 leading to a logic circuit RCO. A timer R, stepped by a train of equispaced clock pulses $r_1$, generates three pulse trains $r_2$, $r_3$ and $r_4$ as illustrated in FIG. 7. Pulses $r_2$ and $r_3$ have the same width as clock pulses $r_1$ but recur at one-fourth and one-half, respectively, of the repetition frequency or cadence of these clock pulses. Pulses $r_4$ are a square wave having the fundamental frequency of pulse train $r_2$ and a 50 percent duty cycle, i.e. a pulse width corresponding to the recurrence period of pulse train $r_3$.

Logic circuit RCO has three output leads 9, 10, 11 extending to a digital/analog converter CDA, with branches 24, 25, 26 terminating at the aforementioned binary accumulator ACC from which three conductors 6, 7 and 8 return to circuit RCO. Pulses $r_2$ are delivered to a stepping input 19 of shift register SP and to a reading input 20 of logic circuit RCO which controls the parallel readout of the contents of that register by way of stage leads 2 – 5. Pulses $r_4$ are fed over a lead 16 to circuit RCO to control the switching, in mid-cycle, from one voltage level to the other in conformity with the selected code character. Pulses $r_3$, generated on a lead 27 including a delay line $T_4$, reach the accumulator ACC and the converter CDA with a 4-bit lag in order to insure that the first word of any input signal $a(t)$ is properly transcoded at the beginning of the corresponding output signal $b(t)$ which is delivered by converter CDA on lead 12.

A lead 29 delivers a zero-setting signal AZ, which may be manually generated, to logic circuit RCO and accumulator ACC.

Figure 6:
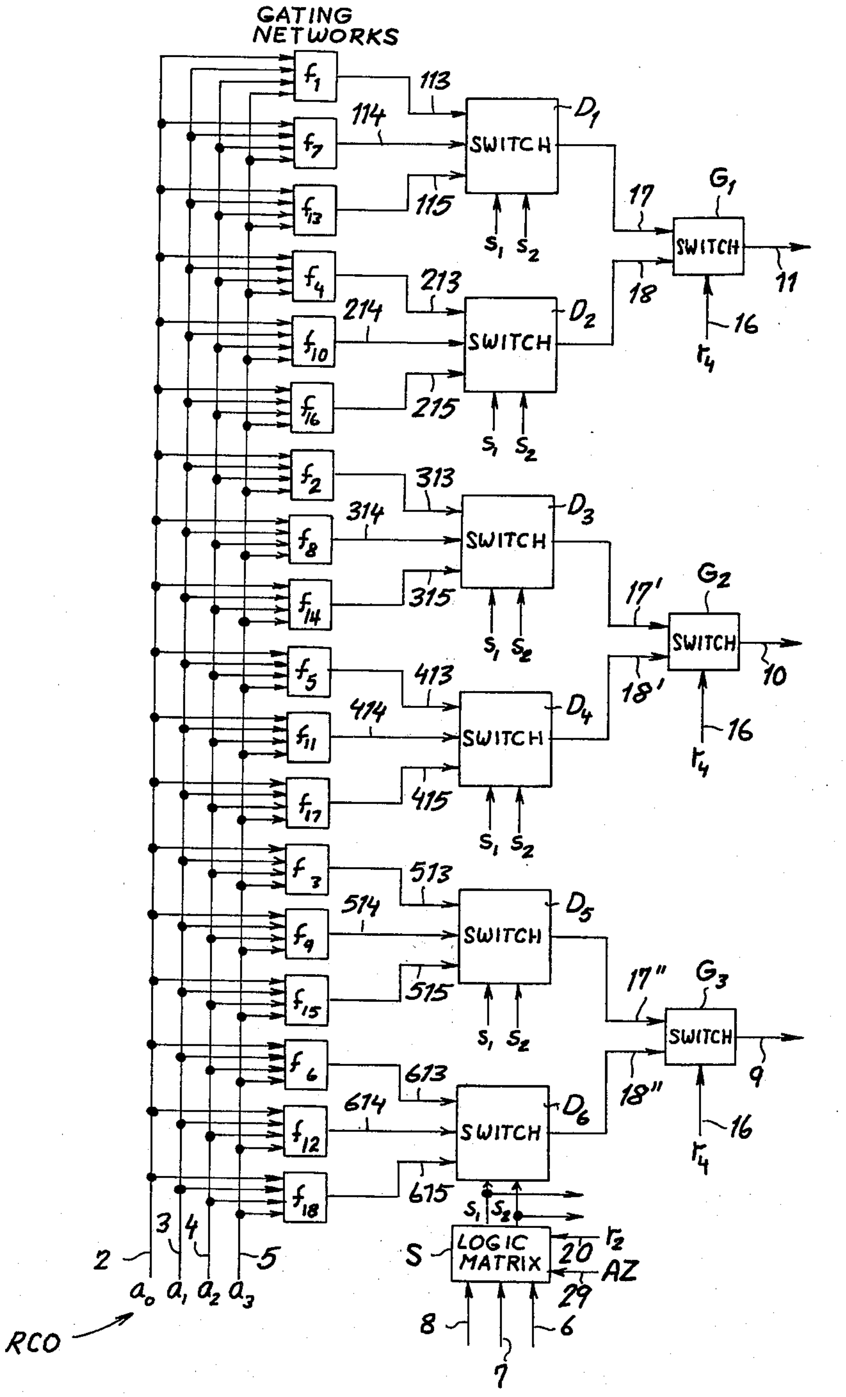
FIG. 6 is a more detailed circuit diagram of a set of gating networks included in the transcoder of FIG. 5.

Reference will now be made to FIG. 6 showing 18 gating networks $f_1$ – $f_{18}$ with inputs connected to the leads 2 – 5 carrying the bits $a_0$ – $a_3$ of incoming words as shown in FIG. 4, these networks generating the bits $b_1$ – $b_{18}$ of FIG. 4. Since the output $b_1$ of network $f_1$ is invariably zero, the network has been illustrated only for the sake of uniformity and can in practice be replaced by a simple ground on its output lead 113. Networks $f_1$, $f_7$ and $f_{13}$, generating the first bit of any character of alphabets $A_1$ – $A_3$, are connected via respective leads 113, 114 and 115 to an electronic three-way switch $D_1$. Similarly, leads 213, 214 and 215 extend from networks $f_4$, $f_{10}$ and $f_{16}$ to a switch $D_2$, leads 313, 314 and 315 link the networks $f_2$, $f_8$ and $f_{14}$ to a switch $D_3$, leads 413, 414 and 415 connect the networks $f_5$, $f_{11}$ and $f_{17}$ to a switch $D_4$, leads 513, 514 and 515 carry the bits of networks $f_3$, $f_9$ and $f_{15}$ to a switch $D_5$, and leads 613, 614 and 615 tie the networks $f_6$, $f_{12}$ and $f_{18}$ to a switch $D_6$.

The six 3-way switches $D_1$–$D_6$ are controlled by two bus bars $s_1$, $s_2$ extending to them in parallel from a logic matrix S which receives the output signals of accumulator ACC via conductors 6 – 8. The switch pairs $D_1$, $D_2$ are connected through leads 17 and 18 to a two-way switch $G_1$ controlled by the square wave $r_4$ on lead 16 and working into output lead 11; in an analogous manner, two-way switches $G_2$ and $G_3$ are connected via leads 17′, 18′ and 17″, 18″ to respective switch pairs $D_3$, $D_4$ and $D_5$, $D_6$ to energize their respective output leads 10 and 9 under the control of square wave $r_4$. In the first half of a cycle, with $r_4 = 0$, switches $G_1$, $G_2$ and $G_3$ pass the bits from switches $D_1$, $D_3$ and $D_5$, respectively; in the second half, with $r_4 = 1$, the outputs of switches $D_2$, $D_4$ and $D_6$ are connected to leads 11, 10 and 9.

Leads 20, carrying the pulse train $r_2$, and 29, energizable with the zero-setting signal AZ, terminate at matrix S.

The logic of the several gating networks $f_2$ - $f_{18}$ will be readily apparent from the table of FIG. 4. In the case of network $f_{11}$, for example, a bit $b_{11}$ is generated on its output leads 414 in accordance with the following Boolean equation:

$$b_{11} = \overline{a_0}\cdot\overline{a_1}\cdot\overline{a_3} + \overline{a_1}\cdot\overline{a_2}\cdot a_3 + \overline{a_0}\cdot a_2\cdot\overline{a_3} + \overline{a_1}\cdot a_2\cdot\overline{a_3} + a_0\cdot a_1\cdot\overline{a_2}\cdot\overline{a_3} + a_0\cdot a_1\cdot a_2\cdot a_3$$

Figure 8:
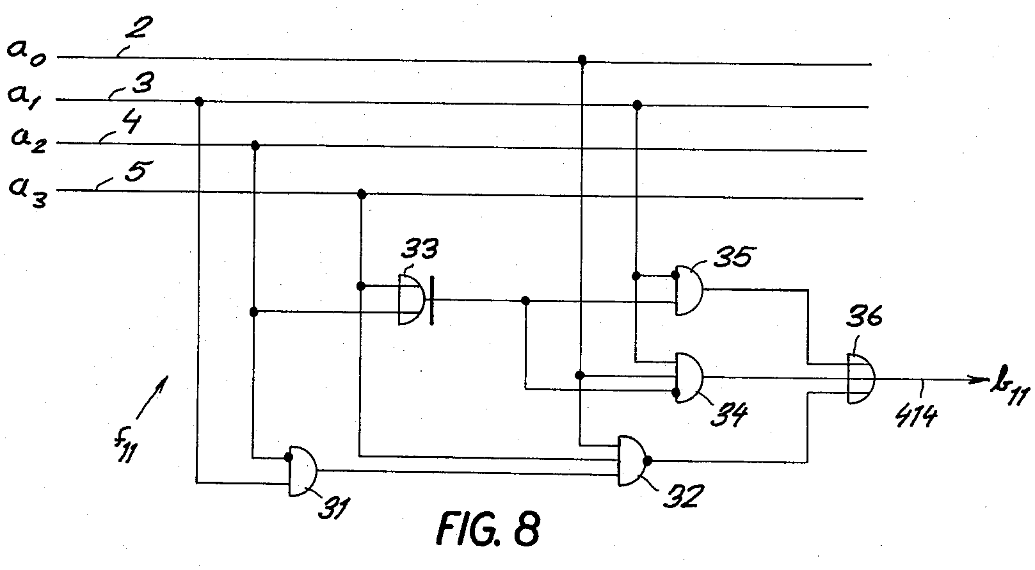
FIG. 8 shows a logic matrix included in one of the gating networks of FIG. 6.

By way of illustration, FIG. 8 shows the gating network $f_{11}$ as comprising an AND gate 31 with an inverting input connected to lead 4 and a noninverting input connected to lead 3, this AND gate working into a NAND gate 32 having two other inputs respectively tied to leads 2 and 5. An Exclusive-OR gate 33 has inputs connected to leads 4 and 5, its output lead terminating at an inverting input of an AND gate 34 and at a noninverting input of an AND gate 35. Gate 34 has two noniverting inputs connected to leads 2 and 3 whereas gate 35 has an inverting input connected to lead 3. The three gates 33, 34 and 35 work into a common OR gate 36 producing the bit $b_{11}$ on lead 414.

Figure 9:
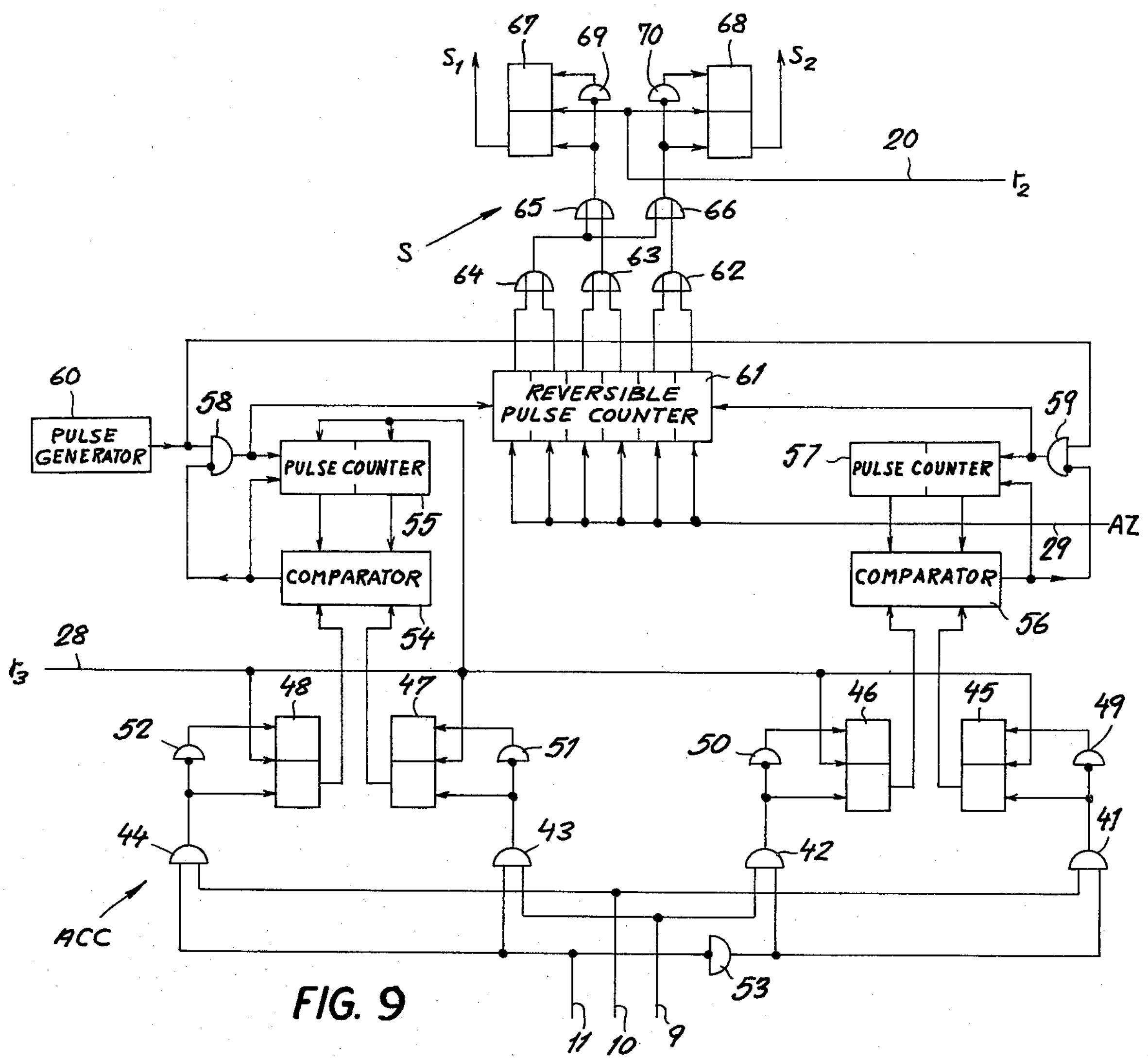
FIG. 9 is a circuit diagram of an accumulator forming part of transcoder of FIG. 5.

In FIG. 9 we have illustrated an embodiment of accumulator ACC comprising four AND gates 41, 42, 43, 44 controlling respective flip-flops 45, 46, 47, 48 of the J/K type, i.e. with a central triggering input and lateral data inputs determining the setting or resetting of any flip-flop upon application of a control pulse $r_3$ to its central input from lead 28. Each of these AND gates is connected to one data input of the associated flip-flop directly and to its other data input through a respective inverter 49, 50, 51, 52.

Lead 11, which carries the first bit of any three-bit grouping shown in FIG. 4, is connected directly to respective inputs of AND gates 43, 44 and through an inverter 53 to respective inputs of AND gates 41, 42. The other inputs of AND gates 41, 44 are connected to lead 10, carrying the second bits, whereas those of AND gates 42 and 43 are connected to lead 9, carrying the third bits. Thus, upon the occurrence of a trigger pulse $r_3$, the energization of lead 11 by switch $G_1$, indicating a negative voltage level, unblocks the gates 43 and 44 for the setting of either or both flip-flops 47, 48 whose outputs terminate at a two-stage comparator 54 also receiving the stage outputs of a two-stage pulse counter 55; in an analogous manner, either or both flip-flops 45, 46 are set upon the occurrence of a pulse $r_3$ in the de-energized state of lead 11, their set outputs terminating at another two-stage comparator 56 also receiving the stage outputs of a two-stage pulse counter 57. Counters 55 and 57 are stepped at a high rate, between pulses $r_2$, through respective AND gates 58 and 59 from a pulse generator 60 as long as their counts do not match the setting of the associated flip-flops 47, 48 or 45, 46; in the presence of such a match, the respective comparator 54 or 56 energizes an inverting input of AND gate 58 or 59 to clear the associated counter and to inhibit its further pulsing.

The stepping pulses traversing the gate 58 or 59 are also delivered to a reversible pulse counter 61 which is stepped forward upon conduction of gate 59 and backward upon conduction of gate 58. Counter 61, which has six stages, can be cleared by a zero-setting pulse AZ on lead 29 at the beginning of signal transmission.

The stage outputs of counter 61 are connected in pairs of three OR gates 62, 63, 64 and two further OR gates 65, 66 in cascade therewith. The latter two OR gates control respective flip-flops 67, 68 of the J/K type whose date inputs are energizable from these OR gates directly for setting and via respective inverters 69, 70 for resetting. These flip-flops are triggerable by the pulses $r_2$ on lead 20 to generate the signals $s_1$, $s_2$ in accordance with the reading of counter 61 which corresponds to the mean signal voltage as accumulated since the last zero-setting by a pulse ZA. Thus, OR gate 62 conducts if the count is either 0 or 1, denoting the lowest voltage range; OR gate 63 conducts in the intermediate range (count 2 or 3) whereas OR gate 64 conducts in the highest range (count 4 or 5). As will be apparent from the foregoing, the count can never go beyond this range 0 – 5.

The multilevel signal $b(t)$ thus generated is easily decoded at the remote end of channel CA (FIG. 1) to restore the original four-bit words of pulse sequence $a(t)$ which in turn can then be conventionally reconverted to an analog voltage constituting a replica of a voice signal or the like from which the pulse train $a(t)$ may be derived at the source SO.

We claim:

1. A method of converting a sequence of bits into a generally balanced multilevel output signal, comprising the steps of:

dividing said sequence into groups of four bits each;

assigning to each possible 4-bit combination a character in each of several alphabets, any character of each alphabet representing a pair of voltage levels selected from a set of seven discrete voltage levels ranging in integral steps from a positive limit +3 through zero to a negative limit −3, the algebraic sums of the voltage levels of any character in one of said alphabets being all either zero or of a first polarity, the algebraic sums of the voltage levels of any character in another of said alphabets being all either zero or of a second polarity;

generating a bipolar output signal whose voltage varies in accordance with the voltage levels represented by characters in a selected alphabet assigned to successive 4-bit groups in a bit sequence to be converted, starting with a character from said one of said alphabets;

determining a mean voltage of the previously generated portion of said output signal; and selecting characters from said one of said alphabets upon said voltage lying in a near-zero range with a relatively low maximum voltage of said first polarity but selecting characters from said other of said alphabets upon said mean voltage lying in an off-zero range with a relatively high maximum voltage of said first polarity, said algebraic sums being so chosen as to tend to maintain said mean voltage in said near-zero range.

2. A method as defined in claim 1 wherein the highest absolute value of the algebraic sums of the voltage levels of the characters in said one of said alphabets equals the absolute value of the difference between the maximum voltage levels of said near-zero and off-zero ranges, the highest absolute value of the algebraic sums of the voltage levels of the characters in said other of said alphabets equaling the absolute value of the minimum voltage level of said off-zero range.

3. A method as defined in claim 2 wherein said alphabets include a further alphabet in which the algebraic sums of the voltage levels of the characters vary in both magnitude and polarity, a character from said further alphabet being selected upon said mean voltage lying in an intermediate range with a maximum voltage between said relatively low and high voltages.

4. A method as defined in claim 3 wherein said near-zero range encompasses the voltage levels 0 and 1, said intermediate range encompassing the voltage levels 2 and 3, said off-zero range encompassing the voltage levels 4 and 5, said algebraic sums assuming values from 0 through 4 in said near-zero and off-zero ranges and assuming values from −2 through +2 in said intermediate ranges.

5. A method as defined in claim 3 wherein said further alphabet is composed of half the characters of said one of said alphabets for the eight highest-ranking 4-bit combinations and half the characters of said other of said alphabets for the eight lowest-ranking 4-bit combinations, the characters of said one and said other of said alphabets being different for any 4-bit combination.

6. A system for converting a sequence of bits into a generally balanced multi-level output signal, comprising:

register means for temporarily storing successive groups of 4-bits each of a sequence to be converted;

logical circuitry responsive to the bits stored in said register means for translating each 4-bit group of said sequence into a character selected from one of several alphabets, any character of each alphabet representing a pair of voltage levels selected from a set of seven discrete voltage levels ranging in integral steps from a positive limit +3 through zero to a negative limit −3, the algebraic sums of the voltage levels of any character in one of said alphabets being all either zero or of a first polarity, the algebraic sums of the voltage levels of any character in another of said alphabets being all either zero or of a second polarity;

accumulator means connected to said logical circuitry for determining the mean voltage of a bipolar output signal synthesized from the selected characters;

switch means in said logical circuitry for alternating between equivalent characters of different alphabets; and control means connected to said accumulator means for operating said switch means in response to said mean voltage to select characters from said one of said alphabets upon said mean voltage lying in a near-zero range with a relatively low maximum voltage of said first polarity and to select characters from said other of said alphabets upon said mean voltage lying in an off-zero range with a relatively high maximum voltage of said first polarity, said algebraic sums being so chosen as to tend to maintain said mean voltage in said near-zero range.

7. A system as defined in claim 6 wherein said logical circuitry includes gating means connected to said register means for generating said characters in binary form, and digital/analog conversion means connected to said gating means for translating the binary characters into multilevel voltages.

8. A system as defined in claim 7 wherein said switch means comprises a set of electronic switches inserted between said gating means and said conversion means, said accumulator means being a digital accumulator connected to the output of said switch means in parallel with said conversion means.

9. A system as defined in claim 8 wherein said alphabets include a further alphabet in which the algebraic sums of the voltage levels of the characters vary in both magnitude and polarity, said further alphabet being composed of half the characters of said one of said alphabets for the eight highest-ranking 4-bit combinations and half the characters of said other of said alphabets for the eight lowest-ranking 4-bit combinations, the characters of said one and said other of said alphabets being different for any 4-bit combination, each of said switches having three operating positions for selecting characters among said one of said alphabets, said other of said alphabets and said further alphabet, a character from said further alphabet being selected upon said mean voltage lying in an intermediate range with a maximum voltage between said relatively low and high voltages.

10. A system as defined in claim 7 wherein said gating means comprises a set of networks connected through said switch means to a plurality of output leads for indicating the magnitude and to a further output lead for indicating the polarity of voltage levels constituting said characters.

* * * * *

UNITED STATES PATENT AND TRADEMARK OFFICE

CERTIFICATE OF CORRECTION

PATENT NO. : 3,913,093

DATED : 14 October 1975

INVENTOR(S) : Girolamo De VINCENTIIS et al

It is certified that error appears in the above-identified patent and that said Letters Patent are hereby corrected as shown below:

In the heading, after line [21] insert:

-- [30] Foreign Application Priority Data

2 March 1973 ITALY 67554-A/73 -- .

Signed and Sealed this

Third Day of August 1976

[SEAL]

Attest:

RUTH C. MASON
*Attesting Officer*

C. MARSHALL DANN
*Commissioner of Patents and Trademarks*